United States Patent
Xie et al.

(10) Patent No.: US 10,343,927 B2
(45) Date of Patent: Jul. 9, 2019

(54) MOLECULAR SIEVE SSZ-112, ITS SYNTHESIS AND USE

(71) Applicant: Chevron U.S.A. Inc., San Ramon, CA (US)

(72) Inventors: Dan Xie, Richmond, CA (US); Kurt Owen Jensen, Richmond, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 0 days.

(21) Appl. No.: 16/151,506

(22) Filed: Oct. 4, 2018

(65) Prior Publication Data

US 2019/0127231 A1 May 2, 2019

Related U.S. Application Data

(60) Provisional application No. 62/577,853, filed on Oct. 27, 2017.

(51) Int. Cl.
  *C01B 39/48* (2006.01)
  *B01J 29/10* (2006.01)
  *B01J 37/10* (2006.01)
  *B01J 29/70* (2006.01)
  *C01B 39/02* (2006.01)
  *C10G 45/64* (2006.01)

(52) U.S. Cl.
  CPC ............... *C01B 39/48* (2013.01); *B01J 29/70* (2013.01); *B01J 37/10* (2013.01); *C01B 39/026* (2013.01); *C01P 2002/72* (2013.01); *C01P 2004/03* (2013.01); *C10G 45/64* (2013.01)

(58) Field of Classification Search
  CPC ............ C01B 39/48; B01J 29/70; B01J 37/10
  See application file for complete search history.

(56) References Cited

U.S. PATENT DOCUMENTS

| 4,851,204 A | 7/1989 | Wilson et al. |
| 9,815,705 B2 * | 11/2017 | Xie ........................ C01B 39/026 |
| 2011/0118520 A1 | 5/2011 | Lai et al. |
| 2017/0291823 A1 | 10/2017 | Xie |

OTHER PUBLICATIONS

J.M. Bennett, R.M. Kirchner and S.T. Wilson "Synthesis and Idealized Topology of AlPO4-52, a New Member of the ABC Six-Ring Family" Stud. Surf. Sci. Catal. 1989, 49, 731-739.
N.K McGuire, C.A. Bateman, C.S. Blackwell, S.T. Wilson and R.M. Kirchner "Structure refinement, electron microscopy, and solid-state magic angle spinning nuclear magnetic resonance characterization of AlPO4-52: An aluminophosphate with a large cage" Zeolites, 1995, 15, 460-469.
PCT International Search Report, International Patent Appl. No. PCT/IB2018/057710, dated Dec. 14, 2018.

* cited by examiner

*Primary Examiner* — David M Brunsman
(74) *Attorney, Agent, or Firm* — Terrence M. Flaherty

(57) ABSTRACT

An aluminosilicate molecular sieve of AFT framework type, designated SSZ-112, is provided. SSZ-112 is synthesized using a mixed-template method. SSZ-112 may be used in catalytic and sorptive processes.

13 Claims, 2 Drawing Sheets

MOLECULAR SIEVE SSZ-112, ITS SYNTHESIS AND USE

CROSS-REFERENCE TO RELATED APPLICATIONS

This application claims priority to and the benefit of U.S. Provisional Application Ser. No. 62/577,853, filed Oct. 27, 2017.

FIELD

This disclosure relates to a novel crystalline molecular sieve material, designated SSZ-112, its synthesis, and its use in catalytic and sorption processes.

BACKGROUND

Zeolitic materials are known to have utility as sorbents and for various types of organic compound conversion reactions. Certain zeolitic materials are ordered, porous crystalline materials having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

U.S. Pat. No. 4,851,204 discloses aluminophosphate molecular sieve AlPO-52 and its synthesis using tetraethylammonium cations and tripropylamine as an organic templating agent. The framework structure of AlPO-52 has been assigned the three-letter code AFT by the Structure Commission of the International Zeolite Association.

According to the present disclosure, an aluminosilicate molecular sieve of AFT framework type, designated SSZ-112, has now been synthesized using a mixed-template approach as described herein.

SUMMARY

In one aspect, there is provided an aluminosilicate molecular sieve of AFT framework type, designated SSZ-112.

In another aspect, there is provided a method of synthesizing an aluminosilicate molecular sieve of AFT framework type, the method comprising: (a) providing a reaction mixture comprising: (1) a source of silicon oxide; (2) a source of aluminum oxide; (3) a source of a Group 1 metal (M); (4) a source of a first organic template (Q1) comprising hexamethonium dications; (5) a source of a second organic template (Q2) comprising one or more of 1-methyl-1-alkylpyrrolidinium cations and 1-methyl-1-alkylpiperidinium cations, where each alkyl group is independently $C_1$-$C_5$ alkyl; (6) a source of hydroxide ions; and (7) water; and (b) subjecting the reaction mixture to crystallization conditions sufficient to form crystals of the aluminosilicate molecular sieve.

In yet another aspect, there is provided an aluminosilicate molecular sieve of AFT framework type containing, within its pore structure, hexamethonium dications and one or more of 1-methyl-1-alkylpyrrolidinium cations and 1-methyl-1-alkylpiperidinium cations, where each alkyl group is independently $C_1$-$C_5$ alkyl.

In a further aspect, there is provided a process for converting a feedstock comprising an organic compound to a conversion product which comprises contacting the feedstock at organic compound conversion conditions with a catalyst comprising an active form of the aluminosilicate molecular sieve disclosed herein.

DETAILED DESCRIPTION

Introduction

Figure 1:
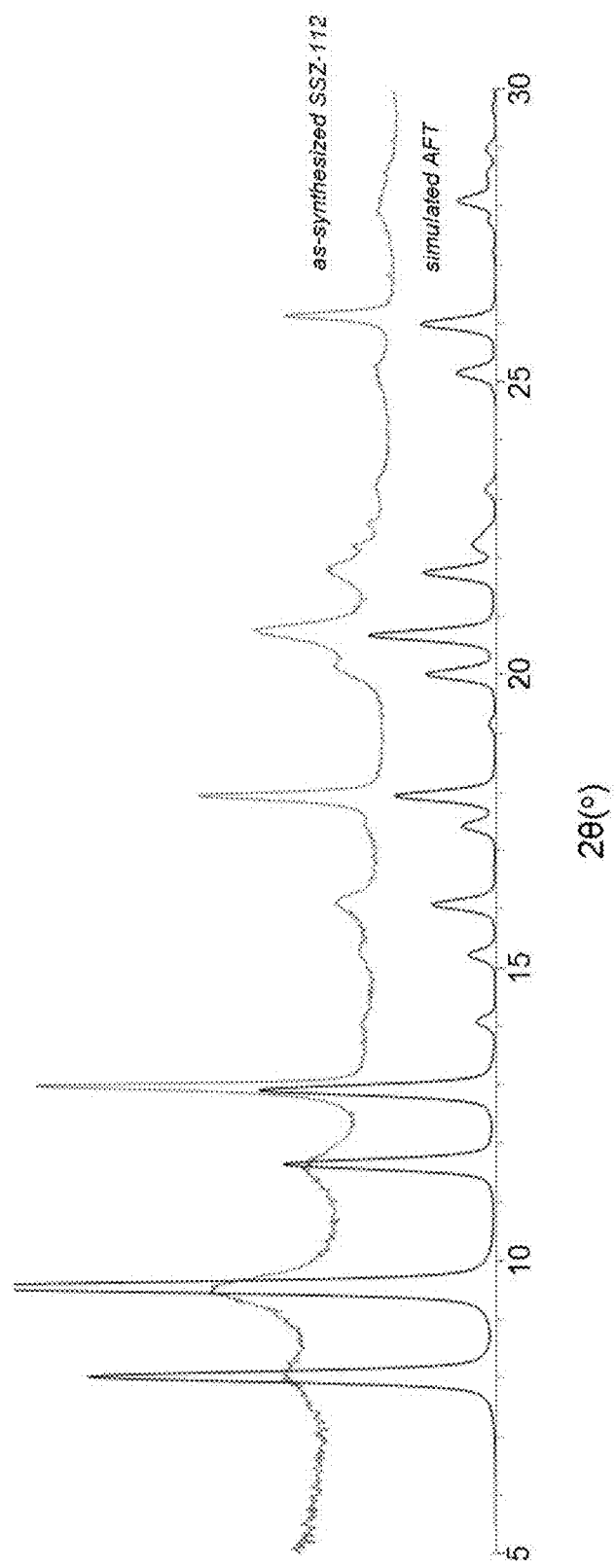
FIG. 1 compares the powder X-ray diffraction (XRD) patterns of the as-synthesized molecular sieve of Example 1 (top pattern) and a simulated powder XRD pattern for an ideal AFT framework type structure (bottom pattern).

The term "framework type" is used in the sense described in the "*Atlas of Zeolite Framework Types*," Sixth Revised Edition, Elsevier (2007).

The term "aluminosilicate" refers to a crystalline microporous solid including aluminum and silicon oxides within its framework. The aluminosilicate may be a "pure aluminosilicate" (i.e., absent other detectable metal oxides within the framework) or optionally substituted. When described as "optionally substituted," the respective framework may contain boron, gallium, indium, germanium, hafnium, iron, tin, titanium, vanadium, zinc, zirconium, or other atoms substituted for one or more of the atoms not already contained in the parent framework.

The term "as-synthesized" is employed herein to refer to a molecular sieve in its form after crystallization, prior to removal of the organic template.

The term "anhydrous form" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, the aluminosilicate molecular sieve of the present disclosure may be synthesized by (a) providing a reaction mixture comprising (1) a source of silicon oxide; (2) a source of aluminum oxide; (3) a source of a Group 1 metal (M); (4) a source of a first organic template (Q1) comprising hexamethonium dications; (5) a source of a second organic template (Q2) comprising one or more of 1-methyl-1-alkylpyrrolidinium cations and 1-methyl-1-alkylpiperidinium cations, where each alkyl group is independently $C_1$-$C_5$ alkyl; (6) a source of hydroxide ions; and (7) water; and (b) subjecting the reaction mixture to crystallization conditions sufficient to form crystals of the aluminosilicate molecular sieve.

The composition of the reaction mixture from which the molecular sieve is formed, in terms of molar ratios, is identified in Table 1 below:

TABLE 1

| Reactants | Broad | Exemplary |
| --- | --- | --- |
| $SiO_2/Al_2O_3$ | 5 to 100 | 30 to 80 |
| $M/SiO_2$ | 0.05 to 1.00 | 0.30 to 0.60 |
| $(Q1 + Q2)/SiO_2$ | 0.05 to 0.50 | 0.05 to 0.30 |
| $OH/SiO_2$ | 0.05 to 1.00 | 0.20 to 0.70 |
| $H_2O/SiO_2$ | 10 to 80 | 15 to 60 | wherein M, Q1 and Q2 are as described herein above.

Suitable sources of silicon oxide include colloidal silica, precipitated silica, fumed silica, alkali metal silicates and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

Examples of suitable Group 1 metals (M) include sodium and potassium. The metal is generally present in the reaction mixture as the hydroxide.

The first organic template (Q1) comprises hexamethonium dications, represented by the following structure (1):

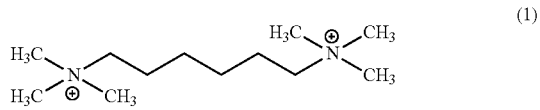

(1)

The second organic template (Q2) comprises one or more of 1-methyl-1-alkylpyrrolidinium cations and 1-methyl-1-alkylpiperidinium cations, represented by the following structures (2) and (3), respectively:

where $R^1$ and $R^2$ are independently $C_1$-$C_5$ alkyl (e.g., $C_2$-$C_4$ alkyl or $C_3$-$C_4$ alkyl). Examples of the second organic template (Q2) include 1-methyl-1-butylpyrrolidinium cations, 1-methyl-1-propylpiperidinium cations, and combinations thereof.

Suitable sources of Q1 and Q2 are the hydroxides and/or other salts of the relevant quaternary ammonium compounds.

The reaction mixture may also contain seeds of a molecular sieve material, such as SSZ-112 from a previous synthesis, desirably in an amount of from 0.01 to 10,000 ppm (e.g., from 100 to 5000 ppm) by weight of the reaction mixture.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the synthesis conditions.

Crystallization and Post-Synthesis Treatment

Crystallization of the molecular sieve from the above reaction mixture can be carried at either static or stirred conditions in a suitable reactor vessel, such as, for example, polypropylene jar or Teflon-lined or stainless steel autoclaves, at a temperature of from 125° C. to 200° C. for a time sufficient for crystallization to occur at the temperature used (e.g., from 24 to 480 hours, or 48 to 240 hours). Crystallization is typically carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step can be performed at atmospheric pressure or under vacuum. The drying step is typically performed at a temperature of less than 200° C.

As a result of the crystallization process, the recovered crystalline molecular sieve product contains within its pore structure at least a portion of the structure directing agents used in the synthesis.

To the extent desired, any cations in the as-synthesized molecular sieve can be replaced in accordance with techniques well known in the art by ion exchange with other cations. Suitable replacing cations include metal ions, hydrogen ions, hydrogen precursor (e.g., ammonium ions), and combinations thereof. Preferred replacing cations may include those which tailor the catalytic activity for certain organic or inorganic conversion reactions. These may include hydrogen, rare earth metals, and metals of Groups 2-15 of the Periodic Table of Elements.

The as-synthesized molecular sieve prepared as described herein may be subjected to subsequent treatment to remove part or all of the organic templates used in its synthesis. This can be conveniently effected by thermal treatment in which the as-synthesized material can be heated to a temperature of at least 370° C. for at least 1 minute and generally not longer than 24 hours. While sub-atmospheric and/or super-atmospheric pressures can be employed for the thermal treatment, atmospheric pressure may be desired for reasons of convenience. The thermal treatment can be performed at a temperature up to 925° C. Additionally or alternatively, the organic templates can be removed by treatment with ozone (see, e.g., A. N. Parikh et al., *Micropor. Mesopor. Mater.* 2004, 76, 17-22). The organic-depleted product, especially in its metal, hydrogen and ammonium forms, is particularly useful in catalytic applications. The organic-depleted molecular sieve in its hydrogen form is referred to herein as the "active form" of the molecular sieve, with or without metal function present.

Characterization of the Molecular Sieve

In its as-synthesized and anhydrous form, molecular sieve SSZ-112 has a chemical composition, in terms of molar ratios, as set forth in Table 2:

TABLE 2

|  | Broad | Exemplary |
| --- | --- | --- |
| $SiO_2/Al_2O_3$ | 5 to 50 | 10 to 25 |
| $(Q1 + Q2)/SiO_2$ | >0 to 0.1 | >0 to 0.1 |
| $M/SiO_2$ | >0 to 0.1 | >0 to 0.1 | wherein Q1, Q2 and M are as described herein above.

It should be noted that the as-synthesized form of the molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-112 has a chemical composition comprising the following molar relationship:

$$Al_2O_3:(n)SiO_2$$

wherein n has a value of in a range of 5 to 50 (e.g., 10 to 50, 5 to 25, 10 to 25, 5 to 20, 10 to 20, 5 to 15, or 10 to 15).

The as-synthesized and calcined forms of SSZ-112 have characteristic powder X-ray diffraction patterns, which in the as-synthesized form of the molecular sieve, includes at least the lines listed in Table 3 below and which, in the calcined form of the molecular sieve, includes at least the peaks listed in Table 4 below.

TABLE 3

Characteristic Peaks for As-Synthesized SSZ-112

| 2-Theta[a] | d-Spacing, nm | Relative Intensity[b] |
|---|---|---|
| 8.04 | 1.100 | M |
| 9.49 | 0.931 | VS |
| 11.63 | 0.760 | M |
| 13.01 | 0.680 | VS |
| 14.02 | 0.631 | W |
| 15.31 | 0.578 | W |
| 16.13 | 0.549 | W |
| 17.45 | 0.508 | W |
| 17.94 | 0.494 | M |

[a] ±0.30 degrees
[b] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

TABLE 4

Characteristic Peaks for Calcined SSZ-112

| 2-Theta[a] | d-Spacing, nm | Relative Intensity[b] |
|---|---|---|
| 8.04 | 1.100 | S |
| 9.53 | 0.927 | VS |
| 11.67 | 0.757 | M |
| 12.98 | 0.682 | S |
| 14.02 | 0.631 | W |
| 15.29 | 0.579 | W |
| 16.10 | 0.550 | W |
| 17.45 | 0.508 | W |
| 17.94 | 0.494 | M |

[a] ±0.30 degrees
[b] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder XRD patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, sufficiently disordered materials and/or small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

Molecular sieve SSZ-112 can be used for separating mixtures of molecular species, removing contaminants through ion exchange and catalyzing various organic or inorganic compound conversion reactions.

Separation of molecular species can be based either on the molecular size (kinetic diameter) or on the degree of polarity of the molecular species. The separation process may comprise contacting at least two components with SSZ-112 to generate at least one separated component.

Molecular sieve SSZ-112 may be used as a catalyst to catalyze a wide variety of organic or inorganic conversion processes including many of present commercial/industrial importance. Examples of organic and inorganic conversion processes that may be catalyzed by SSZ-112 can include alkylation, cracking, hydrocracking, isomerization, oligomerization, conversion of organic oxygenates (e.g., methanol and/or dimethyl ether) to olefins (e.g., ethylene, propylene), synthesis of monoalkylamines and dialkylamines, and the catalytic reduction of nitrogen oxides ($NO_x$).

As in the case of many catalysts, it may be desirable to incorporate SSZ-112 with another component resistant to the temperatures and other conditions employed in organic conversion processes. Such components can include active and inactive materials and synthetic or naturally occurring zeolites, as well as inorganic materials such as clays, silica, and/or metal oxides such as alumina. The latter may be either naturally occurring or in the form of gelatinous precipitates or gels including mixtures of silica and other metal oxides. Use of a material in conjunction with SSZ-112 (i.e., combined therewith or present during synthesis of the crystalline material, which can be in its active state) can tend to change the level of conversion and/or selectivity of the catalyst in certain organic conversion processes. Inactive materials can suitably serve as diluents (e.g., to control the amount of conversion in a given process) so that products can be obtained in an economic and orderly manner, such as without employing other means for controlling the rate of reaction. These materials may be incorporated into naturally occurring clays (e.g., bentonite and/or kaolin) to improve the crush strength of the catalyst under commercial operating conditions. These materials (i.e., clays, oxides, etc.) can function as binders for the catalyst. It can be desirable to provide a catalyst having good crush strength, because, in commercial use, it can be desirable to prevent/limit the catalyst from breaking down into powder-like materials (fines). These clay and/or oxide binders can be employed, e.g., solely to improve the crush strength of the catalyst.

Naturally occurring clays that can be composited with SSZ-112 can include the montmorillonite and kaolin families, which families include the subbentonites, and the kaolins commonly known as Dixie, McNamee, Georgia and Florida clays, as well as others in which the main mineral constituent is halloysite, kaolinite, dickite, nacrite, or anauxite. Such clays can be used in the raw state (as originally mined) and/or initially subjected to calcination, acid treatment, and/or chemical modification. Binders useful for compositing with SSZ-112 can additionally or alternately include inorganic oxides, such as silica, zirconia, titania, magnesia, beryllia, alumina, and mixtures thereof.

Additionally or alternatively to the foregoing materials, as desired, SSZ-112 can be composited with a porous matrix material, such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia, silica-magnesia-zirconia, and mixtures or combinations thereof.

The relative proportions of SSZ-112 and inorganic oxide matrix may vary widely, with the SSZ-112 content typically ranging from 1 to 90 wt. % (e.g., 2 to about 80 wt. %), based on the total composite weight.

EXAMPLES

The following illustrative examples are intended to be non-limiting.

Example 1

22.07 g of deionized water, 1.16 g of a 50% NaOH solution, 0.76 g of a 20% hexamethonium hydroxide solution, 6.53 g of a 11.78% 1-methyl-1-propylpiperidinium hydroxide solution, and 2.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Figure 2:
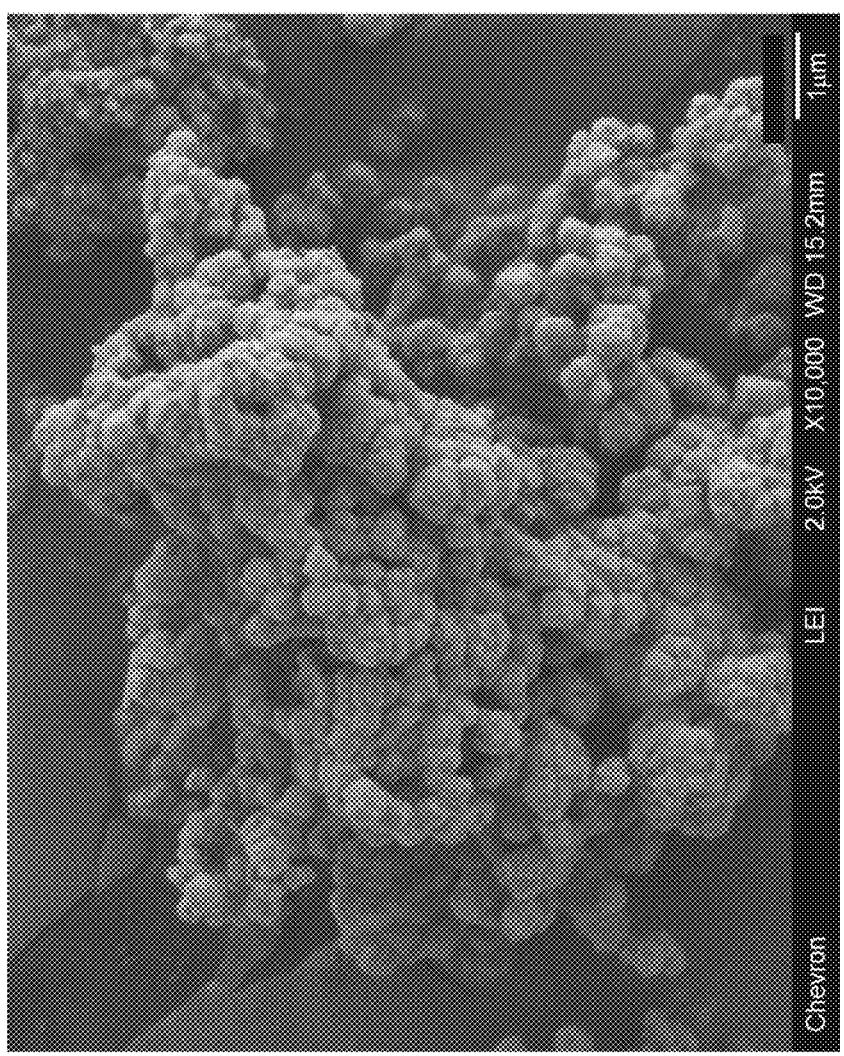
FIG. 2 is a scanning electron micrograph (SEM) image of the as-synthesized molecular sieve of Example 1.

The product was analyzed by powder XRD and SEM. FIG. 1 compares the powder XRD patterns of the as-synthesized product (top pattern) and a simulated powder XRD pattern for an ideal AFT framework type structure (bottom pattern). As shown, the powder XRD pattern of the product is consistent with the product being a pure AFT framework type molecular sieve. A SEM image of the product is shown in FIG. 2 and indicates a uniform field of crystals.

The product had a $SiO_2/Al_2O_3$ molar ratio of 13.79, as determined by Inductively Coupled Plasma—Mass Spectrometry (ICP-MS).

Example 2

22.49 g of deionized water, 1.29 g of a 50% NaOH solution, 0.38 g of a 20% hexamethonium hydroxide solution, 4.36 g of a 11.78% solution of 1-methyl-1-propylpiperidinium hydroxide solution, and 2.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFT framework type molecular sieve.

The product had a $SiO_2/Al_2O_3$ molar ratio of 13.75, as determined by ICP-MS.

Example 3

52.86 g of deionized water, 2.58 g of a 50% NaOH solution, 4.76 g of a 20% hexamethonium hydroxide solution, 15.71 g of a 16.33% 1-methyl-1-butylpyrrolidinium hydroxide solution, and 5.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFT framework type molecular sieve.

The product had a $SiO_2/Al_2O_3$ molar ratio of 13.00, as determined by ICP-MS.

Example 4

32.64 g of deionized water, 1.74 g of a 50% NaOH solution, 1.71 g of a 20% hexamethonium hydroxide solution, 9.80 g of a 11.78% 1-methyl-1-propylpiperidinium hydroxide solution, and 3.00 g of CBV760 Y-zeolite powder (Zeolyst International, $SiO_2/Al_2O_3$ molar ratio=60) were mixed together in a Teflon liner. The resulting gel was stirred until it became homogeneous. The liner was then capped and placed within a Parr Steel autoclave reactor. The autoclave was then put in an oven heated at 150° C. for 3 days. The solid products were recovered from the cooled reactor by centrifugation, washed with deionized water and dried at 95° C.

Powder XRD indicated that the product was a pure AFT framework type molecular sieve.

The product had a $SiO_2/Al_2O_3$ molar ratio of 12.76, as determined by ICP-MS.

Example 5

The as-synthesized molecular sieve of Example 1 was calcined inside a muffle furnace under a flow of air heated to 540° C. at a rate of 1° C./min and held at 540° C. for five hours and cooled to ambient temperature. The powder XRD data indicated that the material remains stable after calcination to remove the organic matter.

Example 6

The calcined material from Example 5 was treated with 10 mL (per g of molecular sieve) of 1N ammonium nitrate solution at 95° C. for 2 hours. The solution was cooled, decanted off and the same process repeated.

After drying, the micropore volume of the ammonium-exchanged product was measured using nitrogen physisorption and the data analyzed via the B.E.T. method. The molecular sieve exhibited a micropore volume of 0.23 cm$^3$/g.

The invention claimed is:

1. An aluminosilicate molecular sieve of AFT framework type.

2. The aluminosilicate molecular sieve of claim 1, having a molar ratio of $SiO_2/Al_2O_3$ in a range of from 5 to 50.

3. The aluminosilicate molecular sieve of claim 1, having a molar ratio of $SiO_2/Al_2O_3$ in a range of from 10 to 25.

4. The aluminosilicate molecular sieve of claim 1, and having, in its calcined form, an X-ray diffraction pattern including the following peaks:

| 2-Theta | d-Spacing, nm | Relative Intensity |
|---|---|---|
| 8.04 ± 0.30 | 1.100 | S |
| 9.53 ± 0.30 | 0.927 | VS |

-continued

| 2-Theta | d-Spacing, nm | Relative Intensity |
|---|---|---|
| 11.67 ± 0.30 | 0.757 | M |
| 12.98 ± 0.30 | 0.682 | S |
| 14.02 ± 0.30 | 0.631 | W |
| 15.29 ± 0.30 | 0.579 | W |
| 16.10 ± 0.30 | 0.550 | W |
| 17.45 ± 0.30 | 0.508 | W |
| 17.94 ± 0.30 | 0.494 | M. |

5. A process for converting a feedstock comprising an organic compound to a conversion product which comprises contacting the feedstock at organic compound conversion conditions with a catalyst comprising an active form of the aluminosilicate molecular sieve of claim 1.

6. An aluminosilicate molecular sieve of AFT framework type containing, within its pore structure, hexamethonium cations and one or more of 1-methyl-1-alkylpyrrolidinium cations and 1-methyl-1-alkylpiperidinium cations, where each alkyl group is independently $C_1$-$C_5$ alkyl.

7. The aluminosilicate molecular sieve of claim 6, containing, within its pore structure, hexamethonium cations and one or more of 1-methyl-1-butylpyrrolidinium cations and 1-methyl-1-propylpiperidinium cations.

8. A method of synthesizing an aluminosilicate molecular sieve of AFT framework type, the method comprising:
 (a) providing a reaction mixture comprising:
  (1) a source of silicon oxide;
  (2) a source of aluminum oxide;
  (3) a source of a Group 1 metal (M);
  (4) a source of a first organic template (Q1) comprising hexamethonium dications;
  (5) a source of a second organic template (Q2) comprising one or more of 1-methyl-1-alkylpyrrolidinium cations and 1-methyl-1-alkylpiperidinium cations, where each alkyl group is independently $C_1$-$C_5$ alkyl;
  (6) a source of hydroxide ions; and
  (7) water; and
 (b) subjecting the reaction mixture to crystallization conditions sufficient to form crystals of the aluminosilicate molecular sieve.

9. The method of claim 8, wherein the reaction mixture has a composition, in terms of molar ratios, as follows:

| | |
|---|---|
| $SiO_2/Al_2O_3$ | 5 to 100 |
| $M/SiO_2$ | 0.05 to 1.00 |
| $Q/SiO_2$ | 0.05 to 0.50 |
| $OH/SiO_2$ | 0.05 to 1.00 |
| $H_2O/SiO_2$ | 10 to 80. |

10. The method of claim 8, wherein the reaction mixture has a composition, in terms of molar ratios, as follows:

| | |
|---|---|
| $SiO_2/Al_2O_3$ | 30 to 80 |
| $M/SiO_2$ | 0.30 to 0.60 |
| $Q/SiO_2$ | 0.05 to 0.30 |
| $OH/SiO_2$ | 0.20 to 0.70 |
| $H_2O/SiO_2$ | 15 to 60. |

11. The method of claim 8, wherein the source of silicon oxide and aluminum oxide comprises zeolite Y.

12. The method of claim 8, wherein the source of a second organic template (Q2) comprises one or more of 1-methyl-1-butylpyrrolidinium cations and 1-methyl-1-propylpiperidinium cations.

13. The method of claim 8, wherein the crystallization conditions include a temperature of from 125° C. to 200° C.

* * * * *